United States Patent
Jepsen

(10) Patent No.: US 9,759,193 B2
(45) Date of Patent: Sep. 12, 2017

(54) METHOD FOR OPERATING A WIND ENERGY PLANT

(71) Applicant: Wobben Properties GmbH, Aurich (DE)

(72) Inventor: Torsten Jepsen, Aurich (DE)

(73) Assignee: Wobben Properties GmbH, Aurich (DE)

( * ) Notice: Subject to any disclaimer, the term of this patent is extended or adjusted under 35 U.S.C. 154(b) by 628 days.

(21) Appl. No.: 14/096,969

(22) Filed: Dec. 4, 2013

(65) Prior Publication Data

US 2014/0091572 A1    Apr. 3, 2014

Related U.S. Application Data

(63) Continuation-in-part of application No. PCT/EP2012/059769, filed on May 24, 2012.

(30) Foreign Application Priority Data

Jun. 7, 2011  (DE) .................. 10 2011 077 129

(51) Int. Cl.
*F03D 7/02* (2006.01)
*F03D 80/40* (2016.01)

(52) U.S. Cl.
CPC .......... *F03D 7/0264* (2013.01); *F03D 7/026* (2013.01); *F03D 80/40* (2016.05);
(Continued)

(58) Field of Classification Search
CPC ........ F03D 7/026; F03D 7/0264; F03D 80/40; F05B 2270/303; F05B 2270/32; F05B 2270/325; Y02E 10/721–10/723
See application file for complete search history.

(56) References Cited

U.S. PATENT DOCUMENTS 6,503,058 B1   1/2003  Selig et al.
6,890,152 B1   5/2005  Thisted
(Continued)

FOREIGN PATENT DOCUMENTS

AU   2009 339 713 A1   1/2011
CN      1441876 A      9/2003
(Continued)

OTHER PUBLICATIONS

Sarkar et al., "Wind Turbine Blade Efficiency and Power Calculation with Electrical Analogy," *International Journal of Scientific Research Publications* 2(2): 1-5, 2012.

*Primary Examiner* — Kenneth Bomberg
*Assistant Examiner* — Jesse Prager
(74) *Attorney, Agent, or Firm* — Seed Intellectual Property Law Group LLP

(57) ABSTRACT

The present invention concerns a method of operating a wind power installation comprising a pod with an electric generator for generating electric current and an aerodynamic rotor coupled to the generator and having one or more rotor blades, including the steps: operating the wind power installation when ice accretion on the rotor blades can be certainly excluded, and stopping the wind power installation when ice accretion on the rotor blades is detected, and time-delayed stoppage or prevention of restarting of the wind power installation when an ice accretion was not detected but is to be expected, and/or time-delayed resumption of operation of the wind power installation when a stoppage condition which led to stoppage of the wind power installation has disappeared again and ice accretion was not detected and ice accretion or the formation of an ice accretion is not to be expected.

16 Claims, 5 Drawing Sheets

(52) U.S. Cl.
CPC ..... *F05B 2270/303* (2013.01); *F05B 2270/32* (2013.01); *F05B 2270/325* (2013.01); *Y02E 10/721* (2013.01); *Y02E 10/723* (2013.01)

(56) References Cited

U.S. PATENT DOCUMENTS

| | | | |
|---|---|---|---|
| 7,182,575 B2 | 2/2007 | Grabau | |
| 7,487,673 B2* | 2/2009 | Ormel | F03D 80/40 416/39 |
| 7,905,701 B2* | 3/2011 | Matsushita | F03D 80/00 415/4.3 |
| 7,909,574 B2* | 3/2011 | Kumar | F03D 7/026 416/1 |
| 8,183,707 B2 | 5/2012 | Siebers et al. | |
| 2007/0154310 A1* | 7/2007 | Wobben | F03D 7/0264 416/1 |
| 2009/0110539 A1* | 4/2009 | Uphues | F03D 7/026 415/13 |
| 2010/0189560 A1* | 7/2010 | Haraguchi | F03D 7/0212 416/1 |
| 2011/0089692 A1 | 4/2011 | Girardin | |
| 2011/0229336 A1 | 9/2011 | Richter et al. | |
| 2012/0226485 A1* | 9/2012 | Creagh | F03D 7/048 703/7 |
| 2013/0106108 A1 | 5/2013 | De Boer et al. | |

FOREIGN PATENT DOCUMENTS

| | | |
|---|---|---|
| CN | 1729359 A | 2/2006 |
| CN | 101424248 A | 5/2009 |
| DE | 195 28 862 A1 | 2/1997 |
| DE | 196 21 485 A1 | 3/1998 |
| DE | 200 14 238 U1 | 7/2001 |
| DE | 103 23 785 A1 | 12/2004 |
| DE | 10 2005 016 524 A1 | 12/2005 |
| EP | 2 055 940 A2 | 5/2009 |
| EP | 2 112 373 A2 | 10/2009 |
| EP | 2 199 606 A2 | 6/2010 |
| JP | 1-131876 U | 9/1989 |
| JP | 2005-069082 A | 3/2005 |
| JP | 2006-528307 A | 12/2006 |
| JP | 2008-523299 A | 7/2008 |
| JP | 2008-286114 A | 11/2008 |
| RU | 74170 U1 | 6/2008 |
| SU | 1652645 A1 | 5/1991 |
| WO | 9709531 A1 | 3/1997 |
| WO | 01/83983 A1 | 11/2001 |
| WO | 2004/104412 A1 | 12/2004 |
| WO | 2007/129907 A2 | 11/2007 |
| WO | 2011/131522 A2 | 10/2011 |

\* cited by examiner

METHOD FOR OPERATING A WIND ENERGY PLANT

BACKGROUND

Technical Field

The present invention concerns a method of operating a wind power installation as well as a corresponding wind power installation and also a wind park having a plurality of wind power installations.

Description of the Related Art

Methods of operating a wind power installation are generally known and the present application is based in particular on a wind power installation as shown in FIG. 1 having a pod with rotor and rotor blades on a hub, the pod being mounted rotatably on a pylon. In operation of the wind power installation the wind acts on the rotor blades and thereby produces a rotary movement which generates electric energy in the pod by means of a generator. In particular, the basic starting point adopted here is wind power installations having rotor blades with an adjustable rotor blade angle, so-called pitch-regulated wind power installations.

At wind power installation erection locations at which temperatures around freezing point can also occur there is the danger that the wind power installation and in particular the rotor blades ice up. Thus, in certain weather conditions rotor blades of wind power installations can suffer from the formation of ice, hoarfrost or snow deposits. Necessary conditions are generally a high level of air humidity or rain or snow fall at temperatures just below freezing point. In that respect the most frequent icing temperatures are in the range of −1° C. to −4° C. Usually icing does not occur above +1° C. and below −7° C. At lower temperatures the available air humidity in the air is too slight.

While ice and hoarfrost deposits can reach severities from which there can be a danger to people and objects upon being thrown off, loose snow deposits, which when snow falls, are deposited on generally insignificant regions of the rotor blade, like for example the flange, normally do not represent a danger.

A problem with wind power installations is in particular the danger due to ice falling or being thrown off. In operation of a wind power installation with iced rotor blades, pieces of ice being flung off can result in danger to those in close proximity. When a wind power installation is stopped the danger due to snow and pieces of ice being detached from the wind power installation does not differ substantially from the danger involved with other high structures.

A method of operating a wind power installation having regard to the possibility of icing is described in German laid-open specification DE 103 23 785 A1. Therein operating parameters such as for example the power of the wind power installation in dependence on a boundary condition such as wind speed are basically compared to reference values which occur at the respective wind speed. From deviations between the detected operating parameter and the reference operating parameter it is possible to infer ice accretion and suitable protective measure can be initiated, in particular that includes stoppage of the wind power installation.

That procedure is based on the realization that ice accretion at the rotor blades influences the aerodynamics of the blades and thus the rotor, thereby giving deviations in the performance of the installation. They are recognized and evaluated by the described comparison of the operating parameters.

A problem in that respect is that this kind of detection presupposes a mode of operation of the wind power installation, which is as steady as possible, stable and as uniform as possible.

However such ideal conditions frequently do not prevail in the case of light wind which is assumed approximately at wind speeds below 3 or 4 m/s. In the case of strong wind which is mostly assumed at wind speeds from 20 m/s or 25 m/s the sensitivity of such known methods is often inadequate. Accordingly, any ice accretion evaluations are not very reliable or accurate ones are even impossible.

A similar problem arises if the wind power installation has come to a stop because, in the stopped condition, no operating parameters can be meaningfully compared to predetermined operating parameters. In that case the wind power installation may have come to a stop for entirely different reasons. They include a stoppage because of excessively light wind, stoppage because of excessively strong wind, stoppage for maintenance purposes and also stoppage due to network failure of the connected electric power supply network into which the wind power installation feeds and from which the wind power installation draws energy for maintaining its operational management. Moreover, stoppage of the wind power installation because of a detected ice accretion is also considered.

BRIEF SUMMARY

One or more embodiments of the present invention improves ice accretion detection or icing detection so that ice accretion detection can be carried out even outside a previously secure recognition range of a wind power installation.

According to one embodiment of the invention there is provided a method of operating a wind power installation. The method is based on a wind power installation comprising a pod having an electric generator for generating electric current and an aerodynamic rotor coupled to a generator and having one or more rotor blades.

Such a wind power installation is operated in a basically known fashion, wherein more specifically the rotor rotates if ice accretion on the rotor blades can be reliably excluded. That is the case in particular when the ambient temperature is high and in particular is markedly above +2° C. However, ice accretion is excluded even at low temperatures around freezing point if the operating parameters in operation of the wind power installation are of the respective value to be expected. That means in particular that, in the part-load range, when there is not sufficient wind for operating the wind power installation at its nominal power, the power produced by the wind power installation corresponds to the power expected at the prevailing wind speed. In the full-load range, when the wind power installation can be operated at nominal power with the prevailing wind, this means that, in the case of a pitch-regulated wind power installation, the set rotor blade angle corresponds to the rotor blade angle to be expected at the prevailing wind speed.

If in contrast ice accretion on the rotor blades is detected the wind power installation is stopped. Ice accretion is detected for example in that, at an ambient temperature which made ice accretion possible, more specifically in particular at an ambient temperature below +2° C., there are deviations between the actual and the expected power or deviations between the actual and the expected rotor blade angle, which indicate ice accretion. In the part-load range that is usually the case when the actual power is markedly below the expected power, because it is to be assumed that the ice accretion is reducing the efficiency of the wind power installation. That is to say the ratio of the electric power generated by the wind power installation to the power afforded in the prevailing wind. Another detection method for ice accretion is for example monitoring the natural frequency of the rotor blades in operation. Even that is based on preconditions which do not always adequately occur. Still further methods are known which can also come up against their limiting factors. They include, to give a further example, an optical method which is poor for use in fog or at night.

If now ice accretion has not been detected but is to be expected and is therefore not to be excluded, it is proposed that the wind power installation be stopped in a time-delayed relationship. This is in comparison to when ice accretion is detected, which was described above. It is to be expected in particular when the ambient temperature is below a limit temperature, in particular below +2° C. Admittedly still no ice may form at +2° C., but in order to exclude risks due to not detecting or not taking account of a possible ice accretion, it is proposed that that relatively high value of +2° C. be taken as a basis. That also takes account of the fact that measurement uncertainties can occur, that the temperature measurement is not effected directly at the potential location of icing and also that the temperature is influenced by flow conditions. Alternatively it is also possible to use another value, in particular a limit value of +1° C. or +3° C. or +4° C.

According to one embodiment of the invention it was recognized that stopping the wind power installation in the case of an ice accretion which is not detected but which is to be expected or not to be excluded increases the safety factor for people and objects in the region of the wind power installation, in which respect the resulting losses of yield turn out to be comparatively slight, measured against the total annual power of the wind power installation. That is due in particular to the fact that such a stoppage occurs at very high wind speeds which however occur rarely, or at very low wind speeds at which in any case little yield can be afforded.

According to one embodiment of the invention it was also recognized that individual pieces of ice are flung off only at greater thicknesses of ice and therefore stoppage of the wind power installation or preventing it from starting up again does not have to be effected immediately but rather can be effected in time-delayed relationship. That reduces any losses of yield, and sometimes even significantly reduces them.

In that case stopping the wind power installation and preventing it from starting up again can be effected under the same preconditions. Time-delayed prevention of restarting of the wind power installation can mean in that respect that a stopped wind power installation is initially not prevented from starting up again, because of the time delay. It therefore starts up again and then—within the time delay—possibly comes to a working point at which it is possible for ice accretion to be detected reliably, in particular more reliably than in the stopped condition. If in that case the method is successful in reliably detecting that there is no ice accretion, that time delay, as a consequence, has had the result that the wind power installation has started again and is operating normally and is producing corresponding output. Without a time delay there would have been the danger that the installation does not start up, freedom from ice would not be detected, and the installation would thus initially remain permanently in a stopped condition.

In the present application the expression stoppage of a wind power installation—unless it is clearly specified differently—is used to mean that the installation stops the rotor, or if need be, allows it to run in a coasting mode. In that case however the operational management system remains in operation, unless further disturbances occur such as for example a network failure, which prevents the operational management system from being maintained. In the event of a network failure state data are stored until the network is restored.

The time delay can start for example from the moment in time or can take account of that moment in time, at which ice accretion was to be expected or could not be excluded. In particular the time delay can begin at the moment when the ambient temperature falls below a limit temperature.

Additionally or alternatively it is proposed that a stopped wind power installation starts up again in time-delayed relationship when a stoppage condition—for example because a shadow is thrown, because of oscillation monitoring or also manually such as for example for maintenance—which lead to stoppage of the wind power installation has ceased again and ice accretion was neither detected nor is it to be expected or not excluded. The time delay begins in particular at the time or takes account of such a time at which the condition occurs, that ice accretion was not detected and is not to be expected. That can mean that, before that moment in time, ice accretion was to be expected or even occurred. It can however also mean that, prior to that moment in time, it was not clear what kind of situation is prevailing. The time delay is therefore proposed to take account of the fact that, although ice accretion was not detected and is not to be expected, there could still be residual ice. Sometimes the observed conditions indicate that the formation of ice accretion is not to be expected, but information about the presence of an ice accretion can be afforded only with difficulty or not at all. In particular such a condition occurs when ambient temperatures are above and in particular are slightly above a limit temperature such as for example 2° C. At a higher temperature, in particular above 2° C., ice formation is not to be reckoned with. If however ice accretion occurred until a short time ago, that can possibly still be present at least in part. Particularly in that case the result of the time delay is that any ice accretion residues can thaw.

In an embodiment it is proposed that stopping or preventing restarting of the wind power installation and also or alternatively causing the wind power installation to start again is effected in dependence on an ice predictive indicator. The ice predictive indicator, which can also simply be referred to as the indicator, forms a measurement with respect to the probability of ice accretion and is appropriately determined or altered. In that respect the ice predictive indicator is determined or altered so that it can give an indication to the probability or is so used without having to represent a probability value in the mathematical sense. The ice predictive indicator is in particular described hereinafter in such a way that a high value indicates a high probability of ice accretion and a low value indicates a low probability of ice accretion. On the basis of the teaching according to the invention a person of ordinary skill in the art can equally well provide that and implement it in reverse.

The ice predictive indicator is preferably determined in dependence on operating parameters and/or ambient conditions and can also be altered in dependence thereon. Preferably time is taken into consideration. It is thus desirable if the ice predictive indicator is so altered that it depends on previous values and how far back in time they occurred and/or how long they have already lasted.

In an embodiment the ice predictive indicator is in the form of a counter. That includes in particular a configuration in which the ice predictive indicator is in the form of variables which are implemented in a process computer and which basically can increase and reduce their value in any way within predetermined limits.

Accordingly in an embodiment it is provided that the ice predictive indicator alters its value in a first direction and in particular increases it when ambient conditions and/or operating conditions of the wind power installation favor ice accretion and/or point to ice accretion, in particular if the ambient temperature is below a limit value. That alteration takes place in particular in time-dependent relationship so that the value alters successively or continuously with increasing time. If therefore in particular the ambient temperature is below a limit temperature like +2° C., then that value progressively increases with time until it has reached such a high value which can be stored as a limit value and which can be referred to as a stoppage limit value, at which the wind power installation is stopped and at which the wind power installation is prevented from starting up again. If the wind power installation for example is in a condition in which, on the basis of past values, it is to be assumed that there is no ice accretion and if the overall situation changes to conditions at which ice accretion can no longer be excluded, then the counter begins slowly to increase. Until it has reached the stoppage limit value—if it reaches it at all—the time elapsed also depends on the rate of increase of that counter.

Additionally or alternatively it is proposed that the counter changes its values into a second direction, in particular reduces them, when ambient conditions or operating conditions of the wind power installation favor or indicate that ice accretion is not present or is reducing, in particular if the ambient temperature is above the limit temperature.

If therefore for example the situation is one in which an ice accretion is to be assumed to be present or that ice accretion has been detected, or if the situation is unclear and if the situation changes to one in which ice accretion or at least ice accretion occurrence can be excluded, then the value of the ice predictive indicator, that is to say the counter value, gradually reduces with time. It is reduced until a lower counter limit value is reached, in particular a restart limit value.

The above-described processes in increasing or reducing the ice predictive counter can last for some hours to up to 10 hours or even longer. In that time a situation which points to the possibility of icing and which results in an increase in the counter can change to a situation in which it is possible to assume that there is a reduction in ice accretion, in particular thawing, or in which there are reliable values which exclude ice accretion. The value of the ice predictive indicator or the counter is in that case reduced again. Equally a reverse situation can occur, in which the counter counts up again. Due to the situation involved therefore the direction in which the value of the ice predictive indicator changes alters. That takes account of the respective past situation. Therefore preferably one and the same counter is used for the increase and the reduction.

In a further embodiment it is proposed that an alteration in the value, that is to say the value of the ice predictive indicator in the form of a counter, is effected at a speed which is dependent on the ambient conditions and/or the wind power installation operating conditions. Accordingly therefore the value does not always increase or reduce in the same way with time, but also takes account of a differentiated way of considering the prevailing conditions.

Preferably in that respect, with a prevailing light wind, that is to say in particular a wind involving wind speeds below 4 m/s, the value is increased more slowly than when a strong wind prevails, more specifically in particular at wind speeds of over 20 m/s if the installation is being operated. That is based on the realization that, at very high afflux speeds at the rotor blade, due to operation of the installation at high wind speeds, ice accretion can form more rapidly and thus the time until the wind power installation is stopped should be shorter. That can be taken into account by more rapidly increasing the value of the ice predictive indicator which thus rapidly reaches a stoppage limit value. However there is also the possibility of implementing a greater time delay with a prevailing light wind in some other fashion than by the ice predictive indicator in the form of the counter, like for example by means of a reference table or look-up table.

Preferably an increase in the value of the ice predictive indicator is also effected more slowly than in operation of the installation with a prevailing strong wind, if the wind power installation was stopped because of an automatic installation stop as in the event of shutdown due to shadow casting or because of a lack of wind or in the event of a manual installation stop, such as for example for maintenance, independently of the prevailing wind speed.

A further embodiment proposes, additionally or alternatively, reducing the value of the ice predictive indicator in the form of a counter more slowly, the lower the ambient temperature is, and in particular reducing the value proportionally to an integral formed from time over a difference in the ambient temperature relative to the limit temperature.

That gives a time delay which is correspondingly shorter, the higher the ambient temperature is. In other words, the wind power installation can start up again correspondingly sooner, the warmer it is. Causing the wind power installation to start up again with a correspondingly shorter time delay, the higher the ambient temperature is, can also be implemented otherwise than by using the ice predictive indicator as the counter. For example a table, a so-called look-up table, can be provided, which specifies the time delay values for given ambient temperatures.

A further embodiment is characterized in that the wind power installation is coupled to an electric network and is stopped in the event of a network failure while, upon network restoration, that is to say when the network failure is cured, the wind power installation is started up again in dependence on a measurement temperature which depends on the ambient temperature at the network failure and the ambient temperature at the network restoration. That is based on the notion that, for the duration of the network failure, more specifically from the beginning thereof to network restoration, information relating to operating parameters and ambient conditions and in particular ambient temperature are not available or are only limitedly available. In order to be able to better estimate the possibility of ice accretion after the end of the network failure, this procedure adopts a temperature value for the ambient temperature which depends on the temperature at network restoration, that is to say the currently prevailing temperature, and the last detected ambient temperature prior to or at the beginning of the network failure.

Preferably the measurement temperature is calculated as a mean value from the ambient temperature at the beginning of the network failure and the ambient temperature upon network restoration, if the network failure is not more than a first failure time, in particular not more than two hours. Here the underlying realization is that the ambient temperature does not change too rapidly and at short failure times consideration of the ambient temperature prior to and after the network failure can already supply meaningful information about the probability of ice accretion. If for example the ambient temperature at network restoration is 2° C., ice accretion is probable if the ambient temperature at the beginning of the network failure was markedly below that, whereas ice accretion is improbable if the ambient temperature at the beginning of the network failure was markedly higher.

It is desirable, in the event of a longer network failure, to provide a temperature safety value for determining the measurement temperature which can also be referred to as the calculated temperature. Thus it is proposed that the measurement temperature be reduced by 2 K in the case of a longer network failure, in particular a network failure of over two hours.

In an embodiment the wind power installation is arranged in a wind park and is stopped if at least one further wind power installation of the wind park is stopped because of ice accretion or predictive suspicion thereof. That is based on the realization that wind power installations behave rather similarly at any event with respect to ice accretion, in the same wind park, because in particular the ambient parameters such as ambient temperature, air humidity and wind speed are similar. However that is also based on the realization that ice accretion of a wind power installation in the park admittedly does not have to necessarily signify that all other wind power installations in the park also involve ice accretion, but that the probability of ice accretion on the other wind power installations of the same park is high. Incorrect prognoses should therefore occur only rarely and should thus scarcely influence the overall yield of the wind power installation over the course of the year, while the safety aspect, mainly preventing ice from being flung off, can sometimes be significantly increased.

Preferably a wind power installation which was stopped because of a detected ice accretion or suspicion thereof will orient its pod in such a way that a spacing which is as great as possible in relation to regions endangered by falling ice, in particular traffic routes and objects, is maintained. In that way not only is the risk due to ice being flung off reduced, but also the danger due to ice purely falling, as can basically also occur in relation to other high building structures.

Preferably a wind power installation is used, which has a heatable wind sensor for measuring the wind speed and heats it at least in the event of a suspicion of ice accretion. For example it is possible to use a so-called ultrasonic anemometer. Thus, even for the situation involving ice formation which can occur not just on the rotor blades but for example also on the anemometer, that is also intended to provide for wind speed measurement which is still reliable. Accordingly ice accretion detection means which require a reliable wind speed can then still be used.

Preferably it is proposed that an ice sensor be used, which directly measures ice accretion on the wind power installation, in particular on one or more of the rotor blades. Such measurement can supplement the above-described ice detection modes. It is to be noted that the use of an ice sensor firstly involves corresponding capital investment costs. They can possibly be quickly amortized if clear information from such an ice sensor that there is no ice accretion means that the wind power installation can be operated without it having to be otherwise stopped, as a precautionary measure.

Preferably it can be provided in a wind park that only some or one of the wind power installations is fitted with such an ice sensor and information obtained therefrom about ice accretion is transmitted to other wind power installations in the park, that do not have an ice sensor. In that way the costs of an ice sensor can be distributed among a plurality of installations. Preferably information obtained by an ice sensor about an ice accretion is evaluated and in particular stored together with the respectively prevailing ambient and/or operating conditions of the respective wind power installation in order to improve prediction of ice accretion, in particular to individualize same for the respective wind power installation. Ice accretion detection can thus be respectively adapted to the type of installation and the place of erection thereof, in particular by a suitable learning program.

BRIEF DESCRIPTION OF THE SEVERAL VIEWS OF THE DRAWINGS

The invention is described in greater detail hereinafter by way of example by means of embodiments with reference to the accompanying Figures.

DETAILED DESCRIPTION

Figure 1:
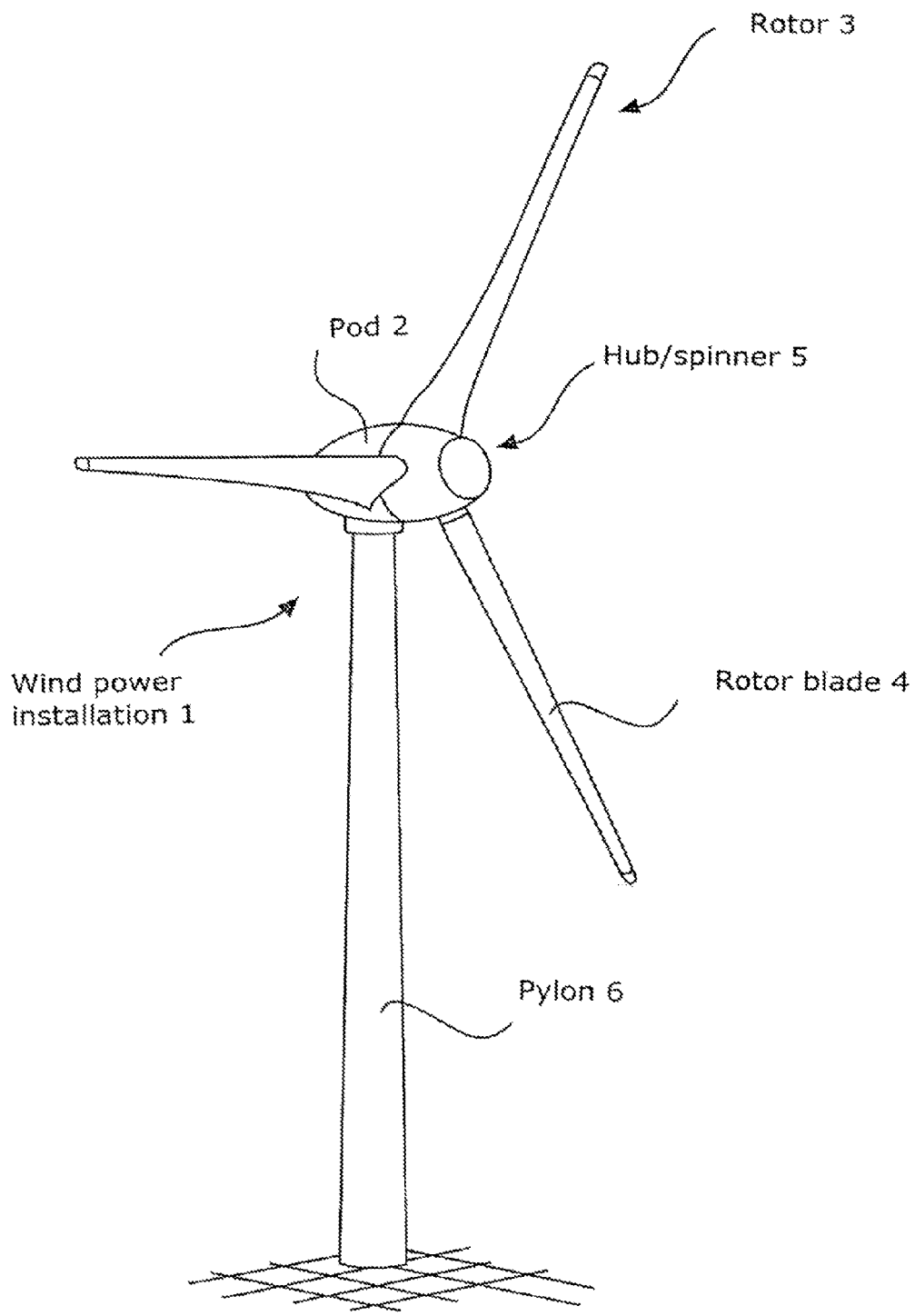
FIG. 1 shows a perspective view of a wind power.

FIG. 1 shows a wind power installation 1 comprising a pod 2, an aerodynamic rotor 3, rotor blades 4, a spinner 5 and a pylon 6.

Figure 2:
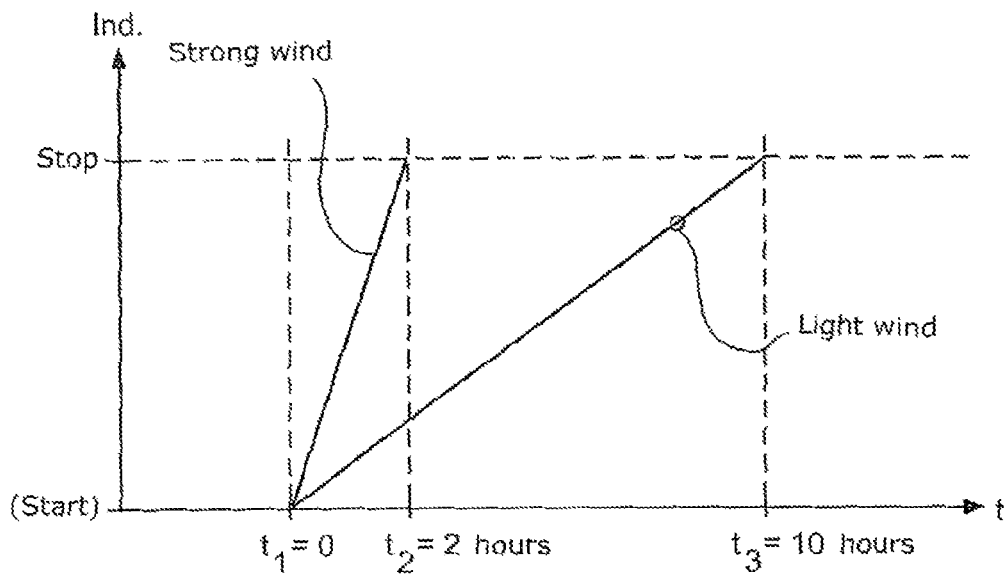
FIG. 2 shows the pattern of an ice predictive indicator for different wind speeds.

FIG. 2 plots the pattern of the ice predictive indicator, namely its value, in relation to time for two examples. In accordance therewith a distinction is drawn between prevailing wind speeds which can be identified as strong wind on the one hand and those which can be identified as a light wind on the other hand. In both examples FIG. 2 concerns the situation where the wind power installation is in operation and the rotor of the installation is rotating and therefore the installation is not stopped. At the time t1=0 an event occurs, which triggers upward counting of the ice predictive indicator. That can be for example that the ambient temperature falls below a limit temperature. It is however for example also considered that the temperature is already below the limit temperature and the prevailing wind speed drops to a value such that it must be assumed that there is a light wind situation, or the prevailing wind speed rises to a value such that it must be assumed that there is a strong wind situation.

The value of the ice predictive indicator prior to the time t1 is not important. That can be for example of the value 0 or a value is first attributed at all to the ice predictive indicator at the time t1.

The initial value of the ice predictive indicator can also be viewed as a value which leads to the wind power installation starting up again in another case. That is not involved in the case shown in FIG. 2 however so that the value "start" is only shown in brackets.

At any event at the time t1 there is a condition, by virtue of which the ice predictive indicator is continuously increased with time. The increase is effected for the prevailing strong wind more rapidly than for a prevailing light wind. Thus, with a prevailing strong wind, the ice predictive indicator already reaches a value at which the wind power installation is stopped, at the time t2. That value is identified in FIG. 2 by the horizontal broken line noted as Stop. In the example, with a prevailing strong wind, the ice predictive indicator reaches the criterion for stoppage of the wind power installation after 2 hours. In the case of a light wind the criterion for stoppage of the wind power installation is only reached at the time t3 which in the example is 10 hours.

FIG. 2 is a simplified view which is essentially based on the fact that the prevailing boundary conditions are substantially steady-state.

Figure 3:
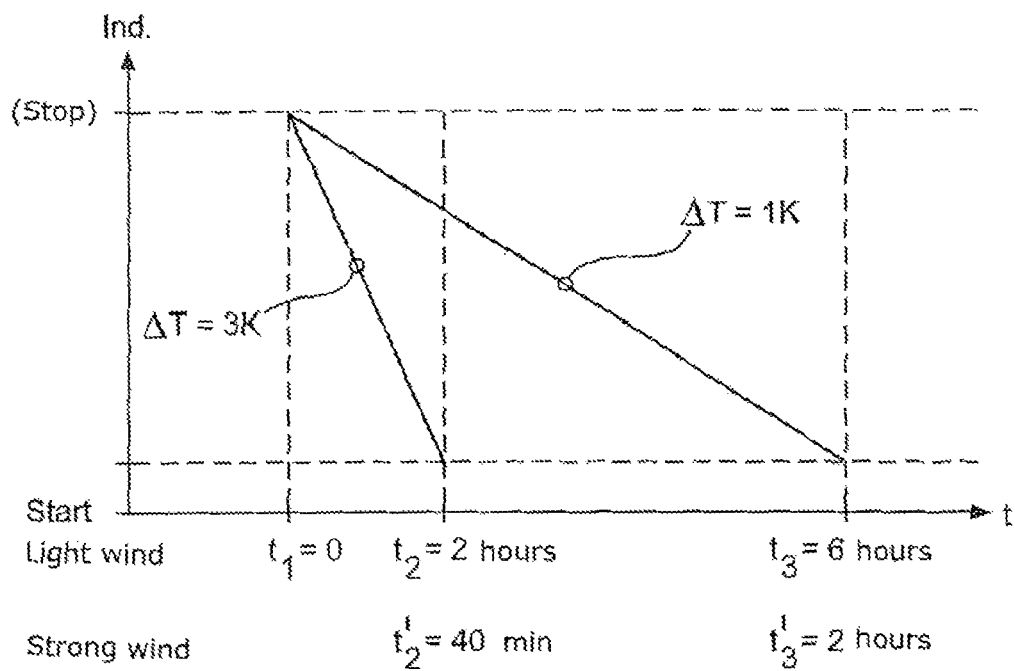
FIG. 3 shows the pattern of an ice predictive indicator for two different ambient temperatures.

FIG. 3 also shows two patterns by way of example of the ice predictive indicator, but for the situation where the wind power installation is stopped. At the time t1 which for simplification is specified as 0, there are criteria which have the result that the ice predictive indicator is reduced. Here too its initial value is firstly not important and it can correspond to the situation in which the installation was stopped, from which reason the "Stop" at the ordinate is shown in brackets. The reduction, which can also be referred to as a downward counting of the ice predictive indicator, is dependent on a differential temperature, namely the current ambient temperature in relation to a limit temperature, wherein the ambient temperature must be greater than the limit temperature. That differential temperature is specified as $\Delta T$ in FIG. 3. The illustration is based on the assumption that steady-state conditions prevail, namely that the differential temperature $\Delta T$ in the one case is constant at 3 K while in the other illustrated case it is constant at 1 K.

The value of the ice predictive indicator as shown in FIG. 3 is reduced in accordance with the integral of the differential temperature over time. In the illustrated examples in FIG. 3 the differential temperature is thus a constant temperature value, namely 3 K in one case or 1 K in the other case, which is integrated over time. In the case of the greater temperature difference of 3 K therefore the ice predictive indicator already reaches the value at which the installation is started again at the time t2, as is shown by the word "Start". In the illustrated example the installation is thus started again after 2 hours.

In the case of the smaller temperature difference of only 1 K the ice predictive indicator only reaches the value at which the installation can be started again at t3. As the temperature difference here is only one third of the first example, t3 is reached after 6 hours.

With the illustrated patterns an integration time constant is used, which depends on the prevailing wind situation. That integration time constant is greater in the case of a prevailing strong wind, more specifically in the illustrated example by the factor of 3, than with a prevailing light wind. Correspondingly, the ice predictive indicator reaches the value at which the installation starts up again, three times as quickly in the case of a strong wind. Those values are specified as t2'=40 minutes for a temperature difference $\Delta T=3$ K and t3'=2 hours for a temperature difference of $\Delta T=1$ K in FIG. 3.

Figure 4:
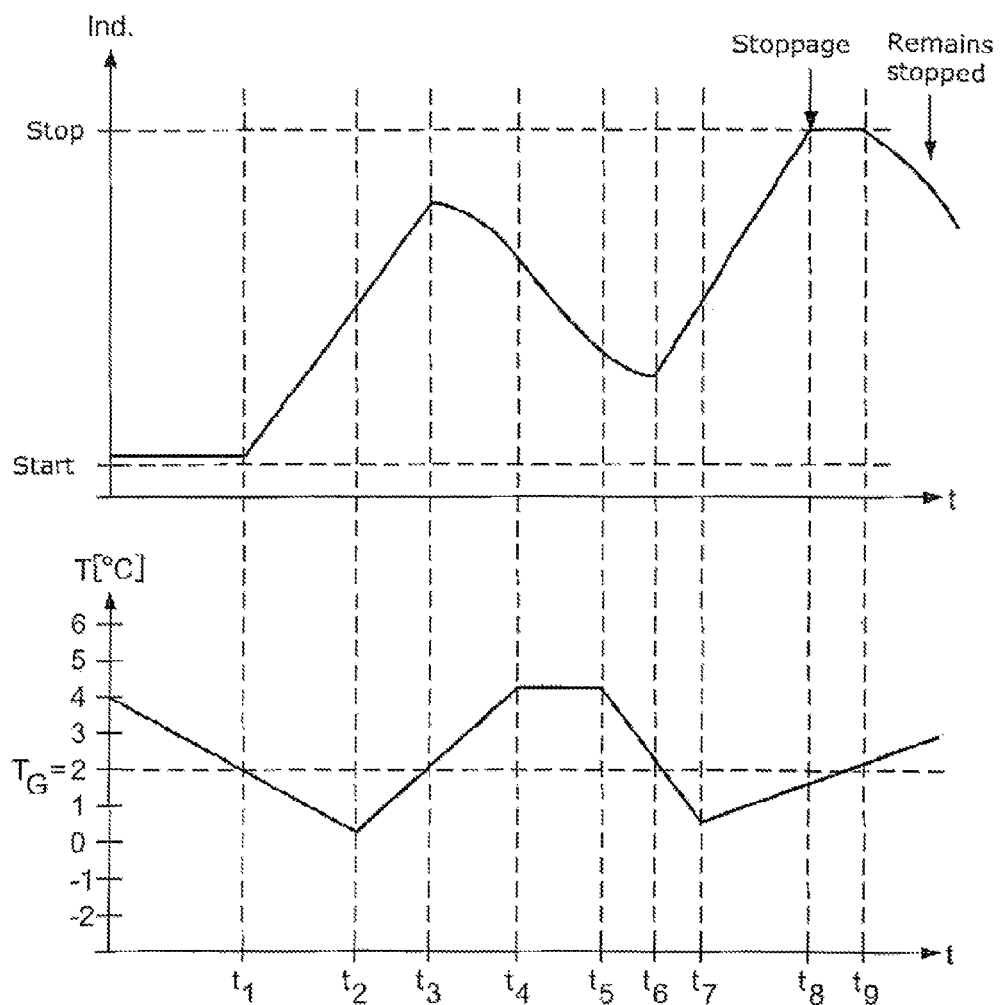
FIG. 4 diagrammatically illustrates the pattern of an ice predictive indicator of an embodiment in dependence on a temperature pattern by way of example.

Referring to FIG. 4, this shows in an example how the ambient temperature influences the pattern of the ice predictive indicator of an embodiment. For that purpose the upper view in FIG. 4 shows the pattern of the ice predictive indicator, initially based on an installation operating in an uncertain ice detection range. The illustration correspondingly also applies if the installation is stopped. The lower view shows a notional pattern of the ambient temperature. The illustrated pattern of ambient temperature was selected for the purposes of clear illustration and does claim to be able to correspond to a possible real temperature pattern of an ambient temperature.

The present example takes a limit temperature of $T_G=2°$ C. as its basis. The actual temperature is at first about 4° C. and is thus above the limit temperature. As the ice predictive indicator is firstly not yet set or involves a start value and the wind power installation is in operation and its rotor is rotating the temperature initially has no effect on the illustrated pattern of the ice predictive indicator.

At time t1 the temperature reaches the value of the limit temperature and falls further. There is thus basically the risk of ice accretion and the ice predictive indicator thus begins to rise from the time t1.

At the time t2 the temperature is below the limit temperature and now rises again. That initially however has no influence on the pattern of the ice predictive indicator and it rises further.

At the time t3 the temperature exceeds the limit temperature and rises further continuously. The ice predictive indicator thus does not rise any further from the time t3 because ice accretion or the occurrence of ice accretion is no longer to be assumed. Rather, the ice predictive indicator is now reduced again. Because the temperature and therewith also the differential temperature rise that gives an integral thereover, basically a second-order configuration.

At the time t4 the temperature is at a value markedly above the limit temperature and initially retains that value. Accordingly there is a reduction in the ice predictive indicator in the form of a linear portion.

At the time t5 the temperature continuously falls and the ice predictive indicator is correspondingly only reduced still more and more slowly.

At the time t6 the temperature reaches the limit temperature again and falls further. Thus the ice predictive indicator is further increased as from the time t6.

At the time t7 the temperature rises again but remains below the limit temperature. The ice predictive indicator thus further increases unchanged.

At the time t8 the temperature is still below the limit temperature. Here however the ice predictive indicator has reached the value which leads to stoppage of the wind power installation. That is identified on the ordinate by the word "Stop".

From the time t8 the temperature admittedly further rises but it initially remains below the limit temperature. As the installation is already stopped the ice predictive indicator is not further altered, which is indicated in FIG. 4 by a constant value in the upper part.

At the time t9 the temperature has reached the temperature limit value and rises further. The ice predictive indicator is now reduced again but the installation remains stopped. If the ice predictive indicator now reduces further until it reaches the value start which is shown just above the abscissa it can start again, which however is no longer further shown in FIG. 4.

Expressed in simplified terms the modes of operation for increasing the ice predictive indicator as shown in FIG. 2 and for reducing the ice predictive indicator as shown in FIG. 3 are combined in FIG. 4. Thus those relationships are combined in FIG. 4, which corresponds to one embodiment.

In principle however the relationships or modes of operation in FIG. 2 on the one hand and FIG. 3 on the other hand can also be used separately from each other.

In an embodiment it is thus possible to expand ice detection or ice accretion detection by an operating status which can be referred to as ice suspicion or ice prediction. By way thereof the operating situations in which icing that possibly occurs would not be reliably recognized are to be detected. In principle ice accretion detection is effected by monitoring the operating characteristics of the wind power installation and it can thus be limited to the operating range of the wind power installation with power generation. If the wind power installation is not generating power, no compensation with the operating characteristics or the management map is also possible. Ice accretion detection can thus only limitedly function, under certain conditions. Those limited conditions are now also taken into consideration.

They include:

Light wind: here ice detection in the case of operation during very low wind speeds, in particular below about 3 to 4 m/s, by monitoring the operating characteristics is not reliably possible.

Strong wind: in the case of operation during high wind speeds over about 20 to 25 m/s the sensitivity of the previous detection method falls and/or often cannot be verified by existing operational experiences.

Installation stoppage with the installation ready for operation.

Network failure.

Thus the previous detection range with respect to ice accretion detection in operation, which can also be referred to as the certain detection range, is limited to wind speeds of between about 4 m/s and 20 m/s, having regard to a safety margin.

Residence durations at low temperatures, mainly ambient temperature below +2° C., increase the icing prediction or suspicion. At temperatures above +2° C. in contrast the suspicion or prediction of icing is reduced again. Likewise in operation of the wind power installation in the certain ice accretion detection range the prediction or suspicion of icing can be reduced.

The proposed methods involve in particular a method which less proposes certain ice detection, but which rather takes account of the possibility of ice occurrence.

Preferably, for operation at wind speeds below 4 m/s, it is assumed that a critical thickness of ice could have formed only within 10 hours. Accordingly that is taken into account in Table 1 hereinafter under the heading Mode I.

For operation with a strong wind, because of the higher afflux speeds at the rotor blade, it is assumed that a critical layer of ice could already have formed within 2 hours. Those relationships are correspondingly taken into consideration in the Table hereinafter as Mode II.

In the case of an automatic installation stoppage, as occurs for example because of a slight wind or because of shadow-casting shutdown, or in the case of a manual installation stoppage as for example for maintenance purposes, it is assumed that a critical thickness of the layer of ice could have formed within 10 hours. Accordingly that is also taken into consideration in the Table hereinafter under the heading Mode I.

With a network failure, it is often not possible for any wind and temperature data to be recorded by the installation control system. However the last data prior to the network failure and the data upon network restoration are available. Existing counter states with respect to ice accretion detection, in particular the value of the ice prediction indicator, also remain available. The times with network failure are taken into account as follows, in dependence on the duration thereof.

Network failure times of up to 2 hours are taken into account with the mean value from the temperature at the beginning of the network failure and the temperature upon network restoration in accordance with Mode I as described in the Table below. Therefore with that mean temperature value which was also referred to as the determination temperature, an ice predictive indicator is increased or counted upwards if that mean temperature value is below a limit temperature. If it is above that limit temperature, the ice predictive indicator is correspondingly reduced. That is correspondingly effected for the duration of the network failure time, as the underlying time involved.

Network failure times of between 2 and 10 hours are taken into account to cover falls in temperature in the meantime, with the mean value from the temperature at the beginning of the network failure and the temperature upon network restoration, less 2 K, in accordance with Mode I described in the Table hereinafter.

In the case of network failure times for example of over 10 hours, it is assumed that reliable information about the past period of time is not possible. For that purpose, having regard to a safety margin, at all temperatures below +5° C., upon network restoration, it is assumed that there is a suspicion of icing. The wind power installation therefore initially remains stopped until icing can be excluded.

Implementation for the described Modes I and II is effected by way of a counter which can also be referred to as the ice predictive counter or the predictive counter and which counts upwards upon a prediction or suspicion of icing and counts down again without that suspicion. In that case, the times between Mode I and Mode II are different, according to the situation in terms of icing suspicion.

With 30 minutes of operation without ice detection in the certain detection range with respect to ice accretion detection, that is to say upon detection using a power curve method in which the measured power curve is compared to a curve to be expected, the suspicion of icing is reduced. If therefore certain detection applies, 30 minutes are sufficient, irrespective of the mode used.

In an embodiment, at outside temperature above +2° C., the difference exceeding +2° C. with respect to the currently prevailing outside temperature in relation to time is summed or integrated. Restarting is then effected only after the expiry of a differential temperature-time integral. Thus for example restarting is effected at 360° C. min. That can mean for example that restarting is effected after 6 hours at an ambient temperature of +3° C. or after 2 hours at an ambient temperature of +5° C. In Mode II restarting is already effected for that case after 120° C. min.

|  | Mode I/duration | Mode II/duration |
| --- | --- | --- |
| Icing suspicion (upward counting) | 600 min | 120 min |
| Operation in the certain detection range (downward counting) | 30 min | 30 min |
| Differential temperature-time integral for outside temperature >2° C. (downward counting) | 360° C. min | 120° C. min |

The times specified in the foregoing Table correspond to those for complete increase and reduction respectively in terms of the predictive suspicion of icing. Intermediate stages are suitably proportionally evaluated.

At the transition from operation of the wind power installation with the rotating rotor to the stopped condition and vice-versa the counter states for ice accretion detection and for the predictive suspicion of icing are suitably transferred or retained. That is intended to ensure that wind power installations are stopped or automatic restarting can be prevented even in the case of a prolonged residence time outside a detection range, which is assumed to be certain, with respect to the usual ice accretion detection, because of an uncertain icing condition with a suspicion or prediction of icing. Such a prolonged residence duration includes for example one of 10 hour or more under prevailing wind conditions below 4 m/s or a residence duration of 2 hours or more under prevailing wind speeds of over 20 m/s.

Figure 5:
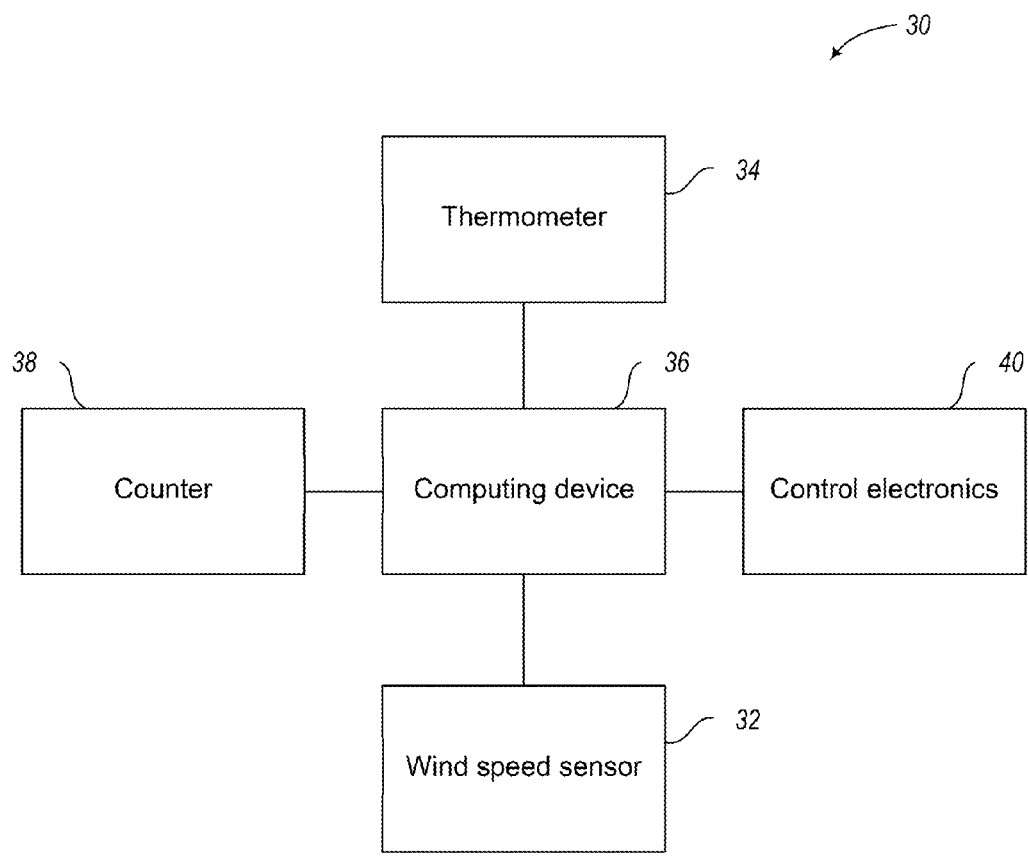
FIG. 5 shows a block diagram of a system according to an embodiment of the invention.

FIG. 5 illustrates a system according to one embodiment. The system includes a wind speed sensor 32 for detecting the wind speed in the environment in which the wind power installation is located and a thermometer 34 for detecting an ambient temperature in which the wind power installation is located. The wind speed sensor 32 and the thermometer 34 are coupled to a computing device 36 in a known way so that the computing device 36 is configured to receive a signal indicative of the temperature from the thermometer 34 and a signal indicative of the wind speed from the wind speed sensor 32. The computing device 36 is configured to determine the ice predictive indicator based on the signals received from the wind speed sensor 32 and the thermometer 34.

The computing device 36 is coupled to a counter 38 and is configured to cause the counter 38 to increment or decrement in view of the ice predictive indicator. The computing device 36 is also coupled to control electronics 40 that controls the operation of one or more wind power installations.

The computing device 36 may include a comparator that is configured to compare the incremented value of the counter 38 to a threshold value. If the ice predictive indicator is above the threshold value, the computing device 36 may generate a signal and send the generated signal to the control electronics 40, which in response to receiving the generated signal may stop the operation of the wind power installation. It is to be appreciated that in some embodiments the counter 38 is integrated in the computing device 36.

Figure 6:
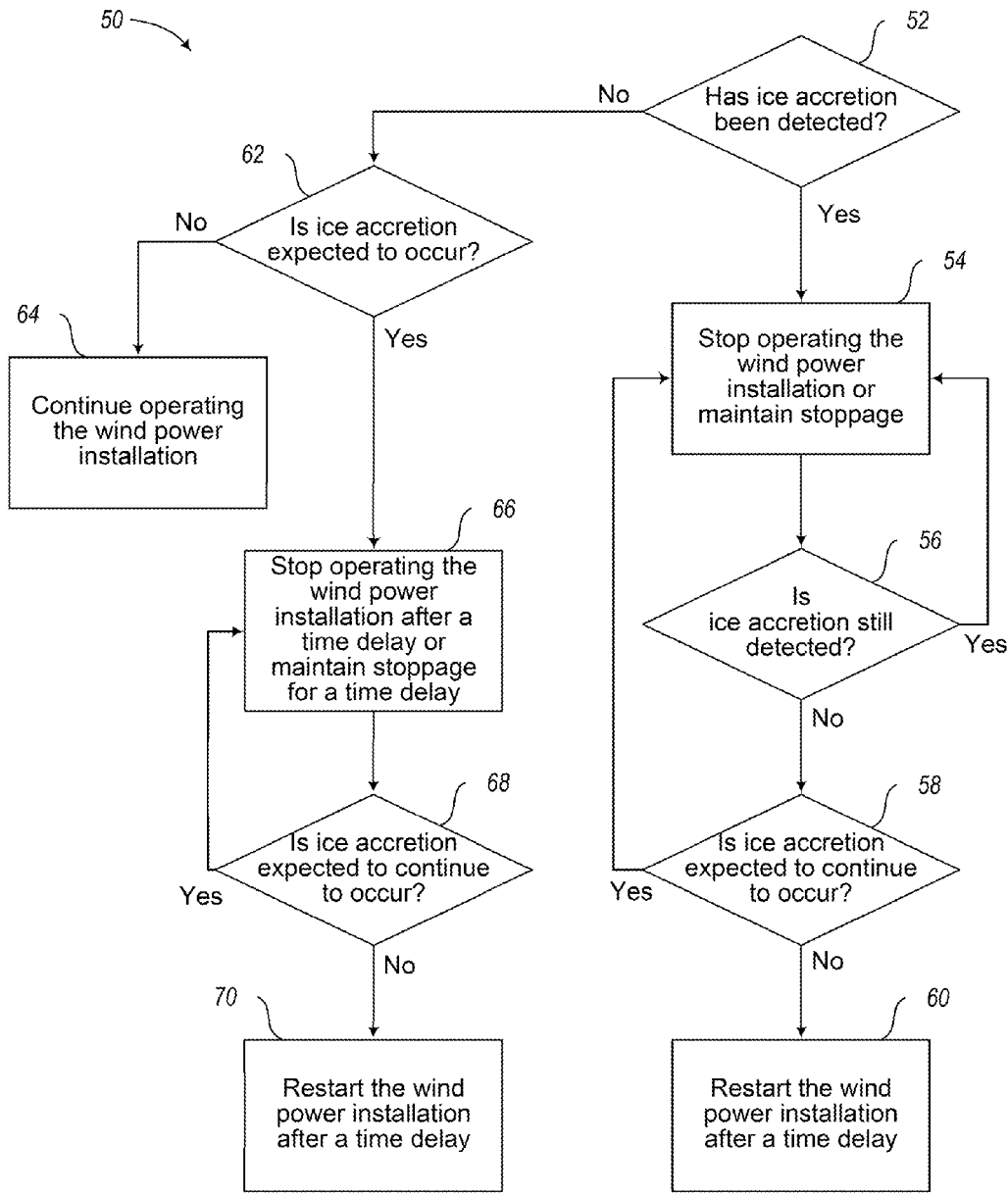
FIG. 6 is a flow chart illustrating one method according to an embodiment of the invention.

FIG. 6 is a flow chart illustrating a method 50 according to one embodiment. The method 50 includes determining if ice accretion has been detected at step 52. If ice accretion has been detected, an associated one or more wind power installations may be stopped from operating or stoppage may be maintained as shown by step 54. The method 50 may further include determining if ice accretion is still detected as indicated by step 56. If ice accretion is still detected, then the method continues back to maintaining stoppage of the wind power installation at step 54. If, however, ice accretion is not detected, then the method includes determining if ice accretion is expected to continue to occur as indicated by step 58. If ice accretion is expected to continue to occur, the method continues back to maintaining stoppage of the wind power installation as step 54. Alternatively, if no ice accretion is expected to occur, the wind power installation may be started after a time delay as indicated by step 60.

If, on the other hand, ice accretion was not detected at step 52, the method includes determining if ice accretion is expected to occur at step 62. If it is determined that ice accretion is not expected to occur, the wind power installation may continue operating under normal operating procedures as shown by step 64. If, however, it is determined that ice accretion is expected to occur, then the wind power installation is stopped after a time delay or stoppage is maintained for a time delay as indicated by step 66. The method then includes determining whether ice accretion is expected to continue to occur at step 68. If ice accretion continues to be expected to occur, then the wind power installation the method includes maintaining stoppage of the wind power installation at step 66. If, however, it is determined that the ice accretion is not expected to occur, the wind power installation may be restarted after a time delay at step 70.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a wind power installation comprising a pod with an electric generator for generating electric current and an aerodynamic rotor coupled to the generator and having one or more rotor blades, the method comprising:
    operating the wind power installation when ice accretion on the rotor blades is determined to be excluded;
    stopping the wind power installation when ice accretion on the rotor blades is detected; and
    time-delayed resuming operation of the wind power installation when a stoppage condition that led to a stoppage of the wind power installation no longer applies and when ice accretion was not detected and ice accretion is determined to not be expected, wherein the time delay starts at a time at which ice accretion is not detected and is not expected,
    wherein the stopping of the wind power installation and the resuming operation of the wind power installation depend on a counter,
    wherein the counter changes its value at a rate that depends on at least one of the ambient conditions and operating conditions of the wind power installation, and wherein at least one of the following applies:
        the counter increases more slowly when the wind power installation operates in a prevailing lighter wind than when it operates in a prevailing stronger wind;
        the wind power installation operating in a prevailing lighter wind is stopped after a greater time delay than with a prevailing stronger wind;
        the counter decreases more slowly when the wind power installation operates in an ambient temperature that is lower than a threshold value or range than when the ambient temperature is above the threshold value or range; and the time delay before restarting the wind power installation is shorter when the ambient temperature is above the threshold value or range than when the ambient temperature is below the threshold value or range.

2. The method according to claim 1 wherein resuming operation of the wind power installation depends on an ice predictive indicator that is determined or altered based on a measurement with respect to a probability of ice accretion.

3. The method according to claim 2, wherein the ice predictive indicator is in the form of a counter and
  alters its value in a first direction when at least one of ambient conditions and operating conditions of the wind power installation indicate a possibility of ice accretion; and
  alters its value in a second direction when at least one of ambient conditions and operating conditions of the wind power installation indicate that ice accretion is not likely.

4. The method according to claim 1 wherein the wind power installation is coupled to an electric network and is stopped in response to a network failure, and upon network restoration the wind power installation is restarted in dependence on a measurement temperature that depends on a first ambient temperature at a beginning of the network failure and a second ambient temperature upon network restoration.

5. The method according to claim 4 wherein:
  the measurement temperature is calculated as a mean value from the ambient temperature at the beginning of the network failure and the ambient temperature upon network restoration if the network failure is not more than a first failure time; and the measurement temperature is calculated as the mean value from the ambient temperature at the beginning of the network failure and the ambient temperature upon network restoration less a temperature safety value if the network failure was longer than the first failure time.

6. The method according to claim 1 wherein the wind power installation is arranged in a wind park and is stopped when at least one further wind power installation of said wind park is stopped due to the detection of ice accretion or the determination that ice accretion is to be expected.

7. The method according to claim 6 wherein the wind power installation that is stopped due to detected ice accretion or suspicion of ice accretion orients its pod in such a way to prevent ice from falling on particular regions therebelow.

8. The method according to claim 1 wherein the wind power installation has a heatable wind sensor for measuring the wind speed, and wherein the wind sensor is heated when at least an ice accretion is detected and an ice accretion cannot be excluded.

9. The method according to claim 1 wherein the wind power installation includes an ice sensor, and ice accretion is detected using the ice sensor.

10. A wind power installation comprising:
  a pod with an electric generator for generating electric current;
  an aerodynamic rotor coupled to the generator;
  one or more rotor blades coupled to the aerodynamic rotor; and
  an ice predictor system that includes:
    a thermometer for detecting ambient temperature;
    a wind speed sensor for detecting wind speed;
    a counter that increments or decrements if a combination of ambient temperature and wind speed is above a threshold; and
    a computing device coupled to the counter, wherein when the counter increases a consecutive number of times in a row, the computing device outputs a signal indicative of ice accretion being detected, and when the counter decreases a consecutive number of times in a row, the computing device outputs a signal indicating that the ice accretion is no longer detected,
  wherein the wind power installation is configured to be operated when the ice predictor system determines that ice accretion on the one or more rotor blades is determined to be excluded,
  wherein the wind power installation is configured to be stopped when the ice predictor system determines that ice accretion on the one or more rotor blades is detected,
  wherein the wind power installation is configured to resume operation after a time-delay when a stoppage condition that led to a stoppage of the wind power installation no longer applies and when ice accretion is not detected and ice accretion is determined to not be expected, wherein the time delay starts at a time at which ice accretion is not detected and is not expected,
  wherein the stopping of the wind power installation and the resuming operation of the wind power installation depend on the counter,
  wherein the counter is configured to change its value at a rate that depends on at least one of the ambient conditions and operating conditions of the wind power installation, and wherein at least one of the following applies:
    the counter is configured to increase more slowly when the wind power installation operates in a prevailing lighter wind than when it operates in a prevailing stronger wind;
    the wind power installation when operating in a prevailing lighter wind is configured to be stopped after a greater time delay than with a prevailing stronger wind;
    the counter is configured to decrease more slowly when the wind power installation operates in an ambient temperature that is lower than a threshold value or range than when the ambient temperature is above the threshold value or range; and
    the time delay before restarting the wind power installation is shorter when the ambient temperature is above the threshold value or range than when the ambient temperature is below the threshold value or range.

11. The wind power installation of claim 10 further comprising control electronics, wherein the computing device outputs the signal indicative of the possibility of ice accretion, the control electronics generates a signal to stop the operation of the wind power installation.

12. The wind power installation of claim 11 wherein the computing devices delays outputting the signal indicating that the possibility of ice accretion no longer applies for a period of time.

13. The wind power installation of claim 11 wherein when the computing device outputs the signal indicating that the possibility of ice accretion no longer applies, the control electronics delays activation of the wind power installation.

14. A wind park comprising at least one wind power installation according to claim 10.

15. The method according to claim 3 wherein the ambient condition that indicates ice accretion includes a temperature limit that is in the range of 1° C. to 4° C.

16. The method according to claim 15 wherein temperature limit is 2° C.

* * * * *